United States Patent
Inoue et al.

(10) Patent No.: US 9,561,721 B2
(45) Date of Patent: Feb. 7, 2017

(54) VEHICLE ACCELERATION SUPPRESSION DEVICE AND VEHICLE ACCELERATION SUPPRESSION METHOD

(71) Applicant: NISSAN MOTOR CO., LTD., Yokohama-shi, Kanagawa (JP)

(72) Inventors: Takuya Inoue, Kawasaki (JP); Yoji Seto, Yokohama (JP)

(73) Assignee: Nissan Motor Co., Ltd., Yokohama-Shi, Kanagawa (JP)

( * ) Notice: Subject to any disclaimer, the term of this patent is extended or adjusted under 35 U.S.C. 154(b) by 0 days.

(21) Appl. No.: 14/440,940

(22) PCT Filed: Oct. 28, 2013

(86) PCT No.: PCT/JP2013/006363
§ 371 (c)(1),
(2) Date: May 6, 2015

(87) PCT Pub. No.: WO2014/083763
PCT Pub. Date: Jun. 5, 2014

(65) Prior Publication Data
US 2015/0298547 A1    Oct. 22, 2015

(30) Foreign Application Priority Data
Nov. 27, 2012 (JP) .................................. 2012-259201

(51) Int. Cl.
*G06F 7/70* (2006.01)
*G06F 19/00* (2011.01)
(Continued)

(52) U.S. Cl.
CPC ............ *B60K 28/14* (2013.01); *B60W 50/087* (2013.01); *B60T 2201/10* (2013.01);
(Continued)

(58) Field of Classification Search
CPC .... B60T 8/1755; B60T 2201/10; B60K 31/00; B60K 31/0008; B60K 28/14; G08G 1/14
(Continued)

(56) References Cited

U.S. PATENT DOCUMENTS

2003/0210157 A1* 11/2003 Gotzig ...................... B60T 7/12
340/932.2
2008/0009990 A1    1/2008 Katoh et al.
(Continued)

FOREIGN PATENT DOCUMENTS

FR      EP 1043213 A1 * 10/2000 ............. B62D 15/00
JP      2007125981 A     5/2007
(Continued)

*Primary Examiner* — Isaac Smith
(74) *Attorney, Agent, or Firm* — Young Basile Hanlon & MacFarlane, P.C.

(57) ABSTRACT

A vehicle acceleration suppression device includes an obstacle relative distance detector configured to detect a relative distance between a vehicle and an obstacle, a drive force manipulation amount detector configured to detect a drive force manipulation amount that is a manipulation amount of an accelerator pedal, a steering manipulation amount detector configured to detect a steering manipulation amount that is the manipulation amount of the steering manipulation element, and a drive force limit unit configured to limit the drive force of the vehicle to a predefined drive force limit value, depending on the steering manipulation amount detected by the steering manipulation amount detector, when the relative distance detected by the obstacle relative distance detector is equal to or shorter than a predefined limiting relative distance and the drive force manipulation amount detected by the drive force manipulation amount detector exceeds a predefined drive force manipulation amount threshold.

10 Claims, 9 Drawing Sheets

(51) Int. Cl.
*G06G 7/00* (2006.01)
*B60K 28/14* (2006.01)
*B60W 50/08* (2012.01)
*G08G 1/14* (2006.01)

(52) U.S. Cl.
CPC ..... *B60W 2510/20* (2013.01); *B60W 2520/10* (2013.01); *B60W 2540/103* (2013.01); *B60W 2540/18* (2013.01); *B60W 2550/10* (2013.01); *B60W 2550/308* (2013.01); *B60W 2710/105* (2013.01); *B60W 2720/106* (2013.01); *B60Y 2300/09* (2013.01); *B60Y 2300/0954* (2013.01); *B60Y 2300/433* (2013.01); *G08G 1/14* (2013.01)

(58) Field of Classification Search
USPC .......................................... 701/70; 180/199
See application file for complete search history.

(56) References Cited

U.S. PATENT DOCUMENTS

2008/0319610 A1* 12/2008 Oechsle .............. B60R 21/0134
　　　　　　　　　　　　　　　　　　　　　701/41
2011/0082613 A1* 4/2011 Oetiker ................ B60W 10/20
　　　　　　　　　　　　　　　　　　　　701/25

FOREIGN PATENT DOCUMENTS

| JP | 2008090664 A |   | 4/2008 |
|----|--------------|---|--------|
| JP | 2009132205 A |   | 6/2009 |
| JP | 2010048240 A |   | 3/2010 |
| JP | 2010195118 A | * | 9/2010 |

\* cited by examiner

ACCELERATION SUPPRESSION
START ACCELERATOR MANIPULATION AMOUNT (deg)

OBSTACLE CONTACT TIME (sec)

ACCELERATION SUPPRESSION
AMOUNT THROTTLE OPENING DEGREE (deg)

STEERING ANGLE (deg)

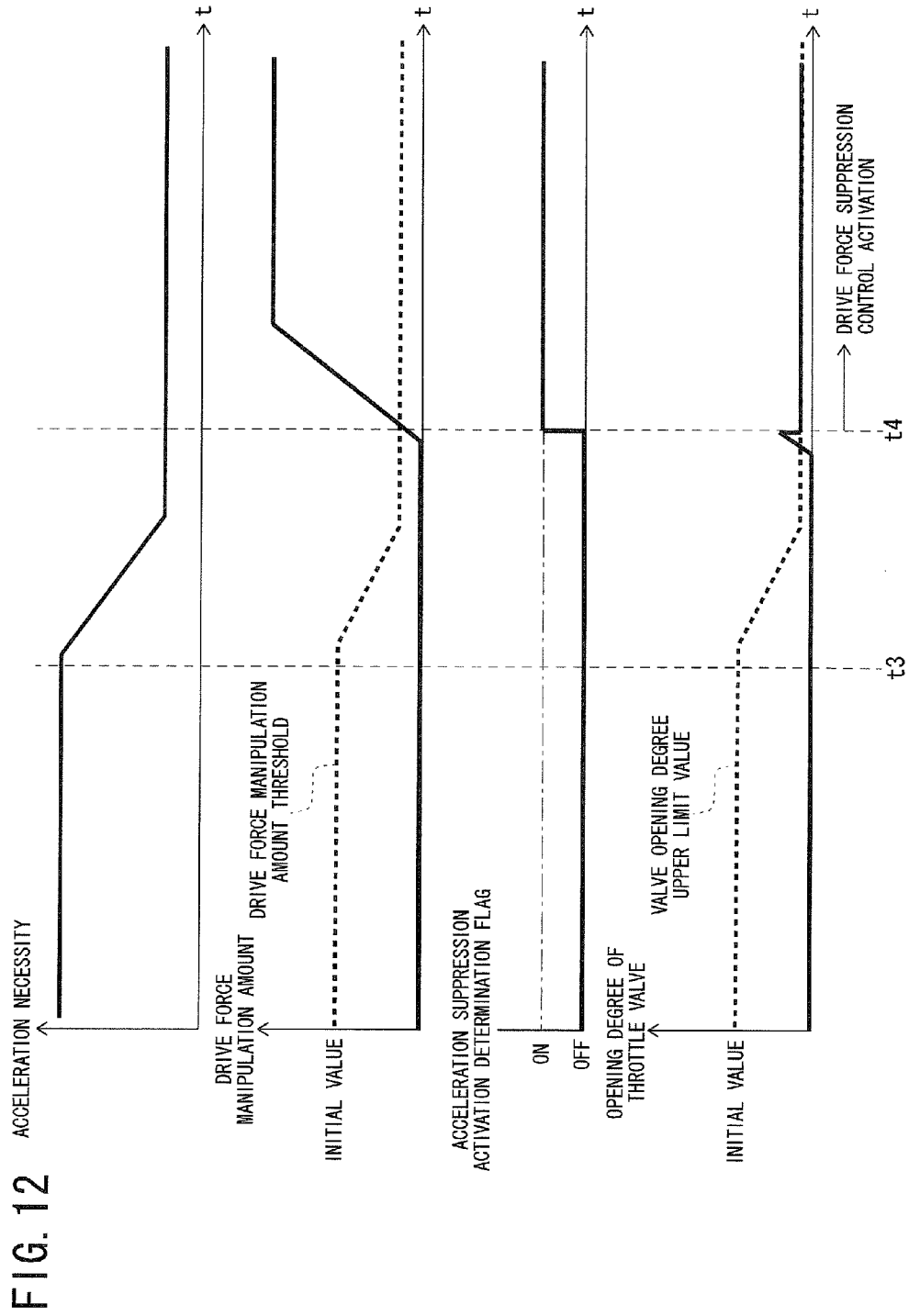

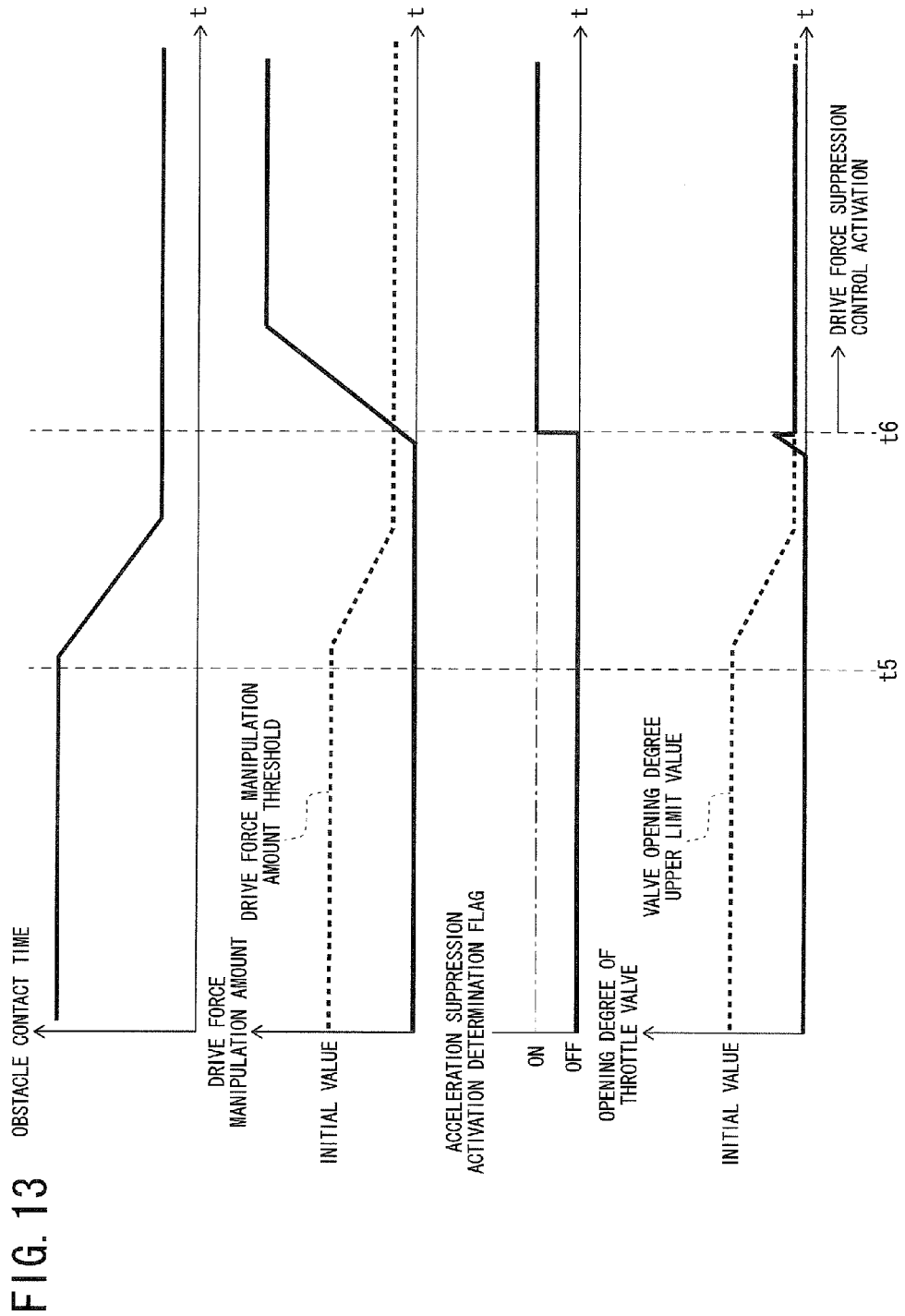

VEHICLE ACCELERATION SUPPRESSION DEVICE AND VEHICLE ACCELERATION SUPPRESSION METHOD

CROSS REFERENCE TO RELATED APPLICATION

The present application claims priority to Japanese Patent Application No. 2012-259201, filed Nov. 27, 2012, incorporated herein in its entirety.

TECHNICAL FIELD

The present disclosure relates to a vehicle acceleration suppression device configured to suppress a contact between a vehicle and an obstacle such as another vehicle, and a vehicle acceleration suppression method.

BACKGROUND

For example, the technology disclosed in JP 2008-90664 A is mentioned as a technology for suppressing a contact between a vehicle and an obstacle (another vehicle or the like).

In the technology disclosed in JP 2008-90664 A, a travel direction of the vehicle at the time of starting moving the vehicle is predicted based on information of the vehicle at the time of parking the vehicle. Then, at the time of starting moving the vehicle, an image of the predicted travel direction of the vehicle is shown on a monitor from the images in which surroundings of the vehicle are captured.

In the technology disclosed in JP 2008-90664 A, however, when a factor of a contact between a vehicle and an obstacle is caused by an inappropriate driving manipulation such as a driver's misunderstanding, an incorrect manipulation, or the like, a problem that it is difficult to suppress the contact between the vehicle and the obstacle may occur.

SUMMARY

The present disclosure has been made in view of the above circumstances and has an object to provide a vehicle acceleration suppression device capable of suppressing a contact between a vehicle and an obstacle, even if a driver makes an inappropriate driving manipulation, and a vehicle acceleration suppression method.

In order to address the above issue, in one embodiment of the present disclosure, a drive force of the vehicle is limited to a predefined drive force limit value depending on a manipulation amount of a steering manipulation element that can be manipulated by a driver of the vehicle. Herein, the driver force is limited, when a relative distance between the vehicle and the obstacle is equal to or shorter than a predefined limiting relative distance, and when a manipulation amount of an opening degree of a drive force instruction manipulation element configured to instruct the drive force of the vehicle exceeds a predefined drive force manipulation amount threshold.

In one embodiment of the present disclosure, the drive force of the vehicle is limited to the drive force limit value depending on the manipulation amount of the steering manipulation element, when the relative distance is equal to or shorter than the predefined limiting relative distance, and when the manipulation amount of the opening degree of the drive force instruction manipulation element configured to instruct the drive force of the vehicle exceeds the predefined drive force manipulation amount threshold.

Accordingly, even if a driver makes an inappropriate driving manipulation, such as a driver's misunderstanding, an incorrect manipulation, or the like at the time of driving the vehicle, it is possible to suppress a contact between the vehicle and an obstacle.

BRIEF DESCRIPTION OF THE DRAWINGS

FIG. 12 is a view illustrative of a time chart when the drive force manipulation amount threshold and the drive force limit value are set based on the height level of the drive force increase necessity calculated by the drive force increase necessity calculator; and FIG. 13 is a view illustrative of a time chart when the drive force manipulation amount threshold and the drive force limit value are set based on the time length of the obstacle contact time calculated by the contact time calculator.

DETAILED DESCRIPTION OF THE EMBODIMENTS

Hereinafter, embodiments of the present disclosure will be described with reference to the drawings.

First Embodiment

Hereinafter, a first embodiment (hereinafter, also referred to as the present embodiment) of the present disclosure will be described with reference to the drawings.

(Configuration)

Figure 1:
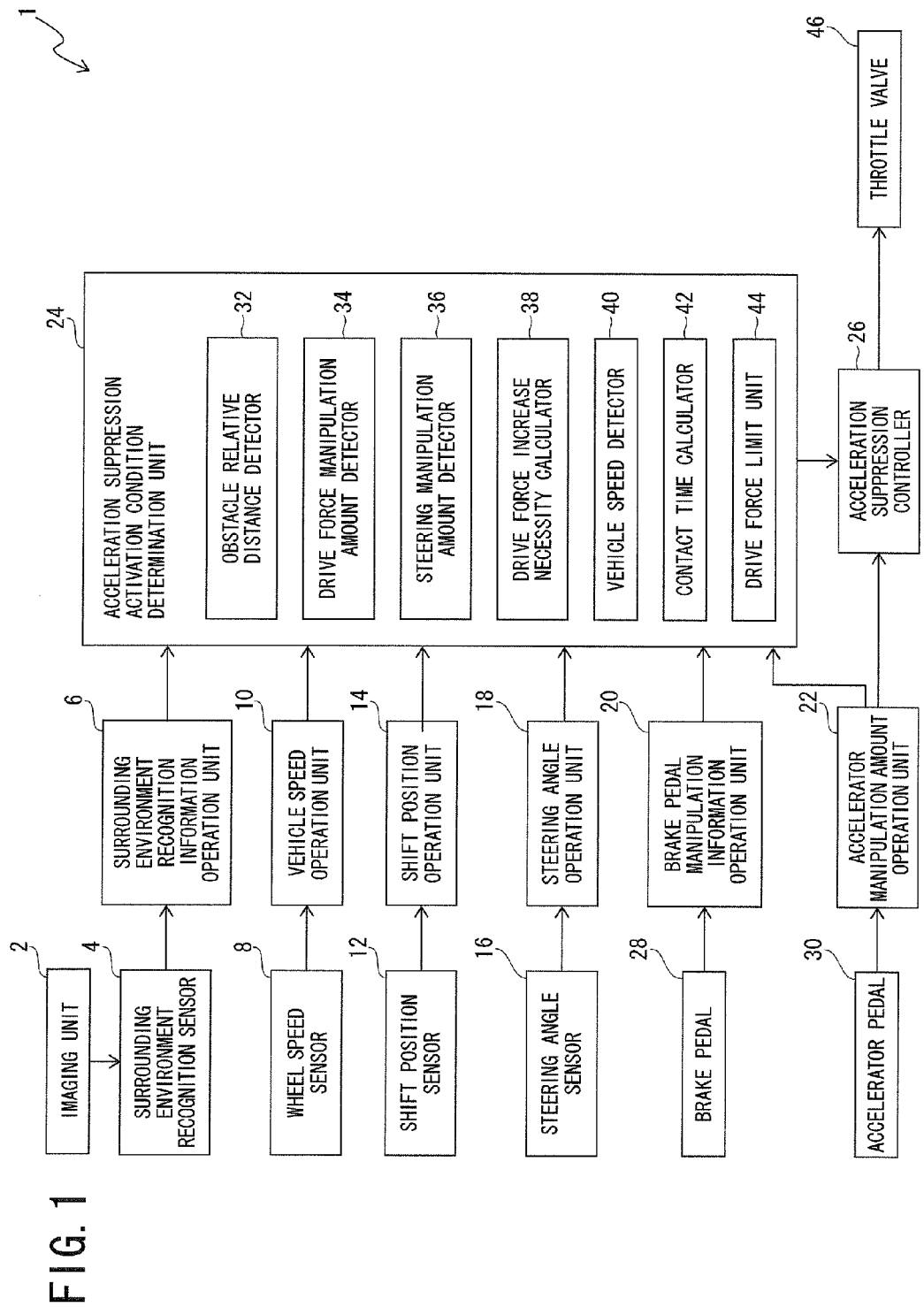
FIG. 1 is a block diagram illustrative of an outline configuration of a vehicle acceleration suppression device in a first embodiment of the present disclosure.

FIG. 1 is a block diagram illustrative of an outline configuration of a vehicle acceleration suppression device 1 in the present embodiment.

The vehicle acceleration suppression device 1 is configured to include, as illustrated in FIG. 1, an imaging unit 2, a surrounding environment recognition sensor 4, a surrounding environment recognition information operation unit 6, a wheel speed sensor 8, a vehicle speed operation unit 10, a shift position sensor 12, and a shift position operation unit 14. In addition, the vehicle acceleration suppression device 1 further includes a steering angle sensor 16, a steering angle operation unit 18, a brake pedal manipulation information operation unit 20, an accelerator manipulation amount operation unit 22, an acceleration suppression activation condition determination unit 24, and an acceleration suppression controller 26.

The imaging unit 2 is configured to capture an image of surroundings of the vehicle V, and to output an information signal (hereinafter, also referred to as "captured image signal") of a captured image to the surrounding environment recognition sensor 4.

It is to be noted that in the present embodiment, as an example, a description will be given of a case where the imaging unit 2 is configured with a front camera 14F, a right side camera 14SR, a left side camera 14SL, and a rear camera 14R. Herein, the front camera is a camera configured to capture a front side image of the vehicle in front-rear direction of the vehicle, and the right side camera is a camera configured to capture a right side image of the vehicle. Also, the left side camera is a camera configured to capture a left side image of the vehicle, and the rear camera is a camera configured to capture a rear side image of the vehicle in the front-rear direction of the vehicle.

The surrounding environment recognition sensor 4 is configured to capture an image of surroundings of the vehicle V, and to generate an information signal (hereinafter, also referred to as "individual image signal") including individual images respectively corresponding to imaging directions of the cameras based on the imaging signal input from the imaging unit 2. Then, such a generated individual image signal is output to the surrounding environment recognition information operation unit 6.

The surrounding environment recognition information operation unit 6 is configured to detect an obstacle existing in the image included in the individual image signal based on the individual image signal which has been received from the surrounding environment recognition sensor 4. Then, the surrounding environment recognition information operation unit 6 is configured to output the information signal (hereinafter, also referred to as "obstacle signal") including the detected obstacle to the acceleration suppression activation condition determination unit 24.

Herein, the obstacle existing in the image included in the individual image signal is an object existing in the surroundings of the vehicle. For example, it may be another vehicle, a wall, or the like.

The wheel speed sensor 8 is configured to detect a rotation speed of the vehicle (for example, front wheel), and to output an information signal (hereinafter, also referred to as "wheel speed signal") including such a detected rotation speed to the vehicle speed operation unit 10.

The vehicle speed operation unit 10 is configured to operate the speed of the vehicle from the rotation speed of the wheel based on the wheel speed signal which has been received from the wheel speed sensor 8. Then, an information signal (hereinafter, also referred to as "vehicle speed operation value signal") including the speed that has been operated is output to the acceleration suppression activation condition determination unit 24.

The shift position sensor 12 is configured to detect a current position of a member, such as a shift knob, a shift lever, or the like, configured to change the shift position (for example, "P", "D", "R" or the like) of the vehicle.

Then, the information signal (hereinafter, also referred to as "shift position signal") including the detected current position is output to the shift position operation unit 14.

The shift position operation unit 14 is configured to operate a gear position (shift position) of the vehicle from a current position of a shift knob or shift lever based on the shift position signal that has been received from the shift position sensor 12. Then, the shift position operation unit 14 is configured to output the information signal including the gear position that has been operated (hereinafter, also referred to as "gear position signal") to the acceleration suppression activation condition determination unit 24.

For example, the steering angle sensor 16 is arranged at a steering column (not illustrated) for rotatably supporting a steering manipulation element (for example, steering wheel), not illustrated.

In addition, the steering angle sensor 16 is configured to detect a current steering angle that is a current rotation angle (steering manipulation amount) of the steering manipulation element that can be manipulated by a driver. Then, the steering angle sensor 16 is configured to output an information signal (hereinafter, also referred to as "current steering angle signal") including the current steering angle that has been detected to the steering angle operation unit 18.

The steering angle operation unit 18 is configured to operate the manipulation amount (rotation angle) from the neutral position of the steering manipulation element in consideration of the current rotation angle of the steering manipulation element based on the current steering angle signal that has been received from the steering angle sensor 16. Then, an information signal (hereinafter, also referred to as "rotation angle signal") including the manipulation amount from the neutral position that has been operated is output to the acceleration suppression activation condition determination unit 24.

It is to be noted that the steering manipulation element is not limited to the steering wheel to be steered by a driver. For example, it may be a lever manipulated by a driver's hand. In this case, the steering angle operation unit 18 is configured to generate and output the angle of inclination of the lever from the neutral position as the information signal corresponding to the above rotation angle signal.

The brake pedal manipulation information operation unit 20 is configured to detect an opening degree of a brake pedal 28, which is a brake force instruction manipulation element. Then, the brake pedal manipulation information operation unit 20 is configured to operate the pressed amount of the brake pedal 28 with a pressed amount "0" being used as a reference, based on the detected opening degree of the brake pedal 28. Further, an information signal (hereinafter, also referred to as "brake side pressed amount signal") including the pressed amount of the brake pedal 28 that has been operated is output to the acceleration suppression activation condition determination unit 24.

Herein, the brake force manipulation element can be operated by the driver of the vehicle, and is configured to instruct a brake force of the vehicle depending on a change in the opening degree. It is to be noted that the brake force instruction manipulation element is not limited to the brake pedal to be pressed for manipulation by a driver with a foot. For example, it may be a lever manipulated by a driver's hand.

The accelerator manipulation amount operation unit 22 is configured to detect the opening degree of an accelerator pedal 30 that is a drive force instruction manipulation element. Then, the accelerator manipulation amount operation unit 22 is configured to operate the pressed amount of the accelerator pedal 30 with a pressed amount "0" being used as a reference, based on the detected opening degree of the accelerator pedal 30. Further, the accelerator manipulation amount operation unit 22 is configured to output an information signal (hereinafter, also referred to as "drive side pressed amount signal") including the pressed amount of the accelerator pedal 30 that has been operated to the acceleration suppression activation condition determination unit 24 and the acceleration suppression controller 26.

Herein, the drive force instruction manipulation element can be manipulated by a driver of the vehicle, and is a configuration of instructing a drive force of the vehicle V depending on a change in the opening degree. It is to be noted that the drive force instruction manipulation element is not limited to the accelerator pedal to be pressed for manipulation by a driver with a foot. For example, it may be a lever manipulated by a driver's hand.

The acceleration suppression activation condition determination unit 24 is configured to include an obstacle relative distance detector 32, a drive force manipulation amount detector 34, a steering manipulation amount detector 36, a drive force increase necessity calculator 38, a vehicle speed detector 40, a contact time calculator 42, and a drive force limit unit 44.

The obstacle relative distance detector 32 is configured to detect a relative distance between the vehicle and an obstacle based on the obstacle signal that has been received from the surrounding environment recognition information operation unit 6. Then, the obstacle relative distance detector 32 is configured to output an information signal (hereinafter, also referred to as "relative distance signal") including the relative distance that has been detected to the drive force increase necessity calculator 38, the contact time calculator 42, and the drive force limit unit 44.

Herein, as the relative distance between the vehicle and the obstacle, for example, a distance between a part (such as a bumper) protruding in the surrounding of the vehicle and the obstacle is used.

Also, as an example in the present embodiment, a description will be given of a case where the obstacle relative distance detector 32 is configured to detect the relative distance based on the image captured by the imaging unit 2.

The drive force manipulation amount detector 34 is configured to detect the drive force manipulation amount that is a manipulation amount of the accelerator pedal 30 based on the drive side pressed amount signal that has been received from the accelerator manipulation amount operation unit 22. Then, the drive force manipulation amount detector 34 is configured to output an information signal (hereinafter, also referred to as "drive force manipulation amount signal") including the drive force manipulation amount that has been detected to the drive force limit unit 44. Herein, the drive force manipulation amount detected by the drive force manipulation amount detector 34 is a manipulation amount of the accelerator pedal 30 manipulated by the driver of the vehicle.

The steering manipulation amount detector 36 is configured to detect the steering manipulation amount that is a manipulation amount of the steering manipulation element based on the rotation angle signal that has been received from the steering angle operation unit 18. Then, the steering manipulation amount detector 36 is configured to output an information signal (hereinafter, also referred to as "steering manipulation amount signal") including the steering manipulation amount that has been detected to the drive force increase necessity calculator 38, the contact time calculator 42, and the drive force limit unit 44. Herein, the steering manipulation amount detected by the steering manipulation amount detector 36 is a manipulation amount of the steering manipulation element manipulated by the driver of the vehicle.

The drive force increase necessity calculator 38 is configured to calculate a drive force increase necessity that is a necessity to increase the drive force of the vehicle based on the relative distance signal that has been received from the obstacle relative distance detector 32 and the steering manipulation amount signal that has been received from the steering manipulation amount detector 36. Then, the drive force increase necessity calculator 38 is configured to output an information signal (hereinafter, also referred to as "drive force increase necessity signal") including the drive force increase necessity signal that has been calculated to the drive force limit unit 44. In other words, the drive force increase necessity calculator 38 is configured to calculate the drive force increase necessity based on the relative distance detected by the obstacle relative distance detector 32 and the steering manipulation amount detected by the steering manipulation amount detector 36.

Figure 2:
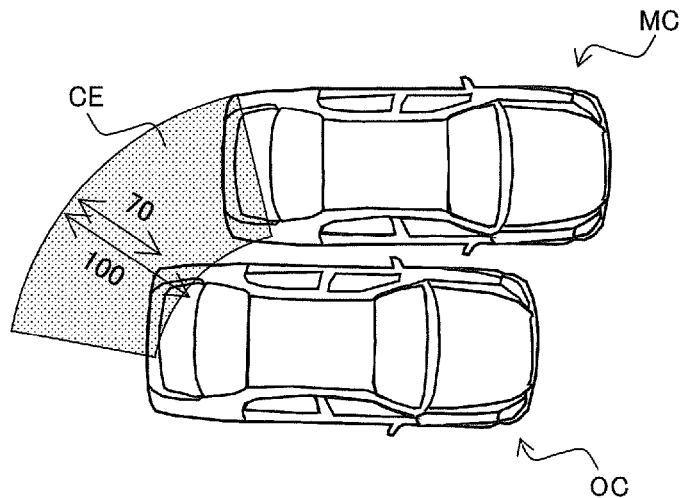
FIG. 2 is a view illustrative of a specific situation when a drive force increase necessity is calculated.

Herein, when the drive force increase necessity is calculated, for example, as illustrated in FIG. 2, the course of the vehicle in a predefined range is predicted from a current location of a vehicle MC based on the relative distance signal and the steering manipulation amount signal that have been received. Then, in the predicted course of the vehicle, a ratio occupied by an obstacle (in FIG. 2, another vehicle OC) in a range of the width of the vehicle MC is operated. Such an operated ratio (in FIG. 2, 70/100) is calculated as the drive force increase necessity (in FIG. 2, 70%).

It is to be noted that FIG. 2 is a view illustrative of a specific situation when a drive force increase necessity is calculated. FIG. 2 illustrates a situation that the vehicle MC moves rearward (travels rearward in a front-rear direction of the vehicle) while a driver is making a steering operation with a steering manipulation element to turn to the right (clockwise). Also, in FIG. 2, a region indicating the predicted course of the vehicle is represented by a code "CE". In addition, in the situation illustrated in FIG. 2, as an example, the predefined range is set to a range within 4 meters from the current location of the vehicle MC.

The vehicle speed detector 40 is configured to detect the speed of the vehicle based on the vehicle speed operation value signal that has been received from the vehicle speed operation unit 10. Then, the vehicle speed detector 40 is configured to output an information signal (hereinafter, also referred to as "vehicle speed signal") including the speed of the vehicle that has been detected to the contact time calculator 42.

The contact time calculator 42 is configured to calculate an obstacle contact time based on the relative distance signal that has been received from the obstacle relative distance detector 32, the steering manipulation amount signal that has been received from the steering manipulation amount detector 36, and the vehicle speed signal that has been received from the vehicle speed detector 40. Then, the contact time calculator 42 is configured to output an information signal (hereinafter, also referred to as "obstacle contact time signal") including the obstacle contact time that has been calculated to the drive force limit unit 44.

Herein, the obstacle contact time is a period of time that elapses until the vehicle comes into contact with an obstacle. In other words, the contact time calculator 42 is configured to calculate the obstacle contact time based on the relative distance that has been detected by the obstacle relative distance detector 32, the steering manipulation amount that has been detected by the steering manipulation amount detector 36, and the vehicle speed that has been detected by the vehicle speed detector 40.

Figure 3:
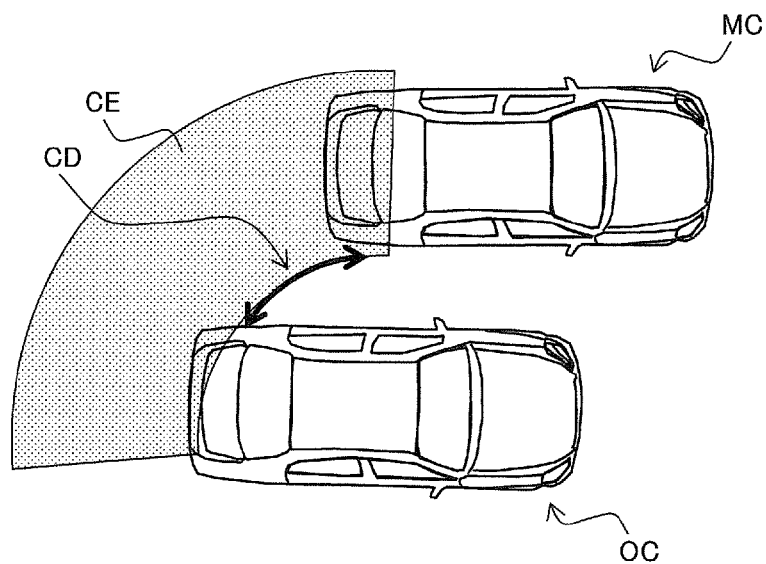
FIG. 3 is a view illustrative of a specific situation when an obstacle contact time is calculated.

In addition, when the obstacle contact time is calculated, for example, as illustrated in FIG. 3, the course of the vehicle within the predefined range is predicted from the current location of the vehicle MC based on the relative distance signal and the steering manipulation amount signal that have been received. Then, in the predicted course of the vehicle MC, the obstacle contact distance that is a distance between the current location of the vehicle MC and the obstacle (in FIG. 3, another vehicle OC) is operated. In addition to this, the obstacle contact time is calculated from the obstacle contact distance that has been operated and the speed of the vehicle MC based on the speed signal that has been received.

It is to be noted that FIG. 3 is a view illustrative of a specific situation when the obstacle contact time is calculated. FIG. 3 illustrates a situation that the vehicle MC moves rearward (travels rearward in a front-rear direction of the vehicle) while a driver is making a steering operation with a steering manipulation element to turn to the right (clockwise). Also, in FIG. 3, a region indicating the predicted course of the vehicle is represented by a code "CE", whereas the obstacle contact distance is represented by a code "CD".

The drive force limit unit 44 is configured to carry out processing of operating a drive force limit demand value for limiting the drive force of the vehicle to a predefined drive force limit value based on various pieces of information signals that have been received. Then, when a following condition (A) is satisfied, the drive force limit unit 44 is configured to output an information signal (hereinafter, also referred to as "drive force limit demand value signal") including the drive force limit demand value that has been operated to the acceleration suppression controller 26. It is to be noted that the processing to be carried out by the drive force limit unit 44 will be described later.

Condition (A): The drive force manipulation amount that has been detected by the drive force manipulation amount detector 34 exceeds a predefined drive force manipulation amount threshold.

It is to be noted that the drive force manipulation amount threshold is a threshold to start controlling the drive force of the vehicle to be limited to the predefined drive force limit value, and is set in the processing to be described below. In addition, the drive force limit value is an upper limit value of the opening degree of a throttle valve 46 to be described below, and is set in the processing to be described below.

The acceleration suppression controller 26 is configured to change the opening degree of the throttle valve 46 based on the drive side pressed amount signal that has been received from the accelerator manipulation amount operation unit 22 and the drive force limit demand value signal that has been received from the drive force limit unit 44, so that the drive force of the vehicle becomes the drive force limit value. Herein, the throttle valve 46 is a valve provided with a drive source (engine), not illustrated, of the vehicle.

(Processing to be Carried Out by the Drive Force Limit Unit 44)

Next, referring to FIG. 1 to FIG. 3, by using FIG. 4 to FIG. 9, an example of processing to be carried out by the drive force limit unit 44 will be described.

Hereinafter, as an example of the process to be carried out by the drive force limit unit 44, processes of (P1) to (P6) will be described. It is to be noted that the processing to be carried out by the drive force limit unit 44 is not limited to the processes of (P1) to (P6) to be described below.

Also, the processing to be carried out by the drive force limit unit 44 may be a combination of at least two of the processes of (P1) to (P6) to be described below.

In addition, processes of (P1) to (P6) to be described below is carried out when at least Condition (B) is satisfied in following Conditions (B) and (C).

Condition (B): The relative distance detected by the relative distance detector 32 is equal to or shorter than a predefined limiting relative distance.

Condition (C): The pressed amount of the brake pedal 28 by a driver is "0". In other words, the brake pedal 28 is not manipulated by the driver.

Here, for example, setting of the limiting relative distance is changed depending on the speed of the vehicle that has been detected by the vehicle speed detector 40. In this case, as the speed of the vehicle detected by the vehicle speed detector 40 is higher, the limiting relative distance is set to be longer.

In addition, whether or not the pressed amount of the brake pedal 28 by the driver is "0" is determined based on the pressed amount included in the brake side pressed amount signal that has been received from the brake pedal manipulation information operation unit 20.

Figure 4:
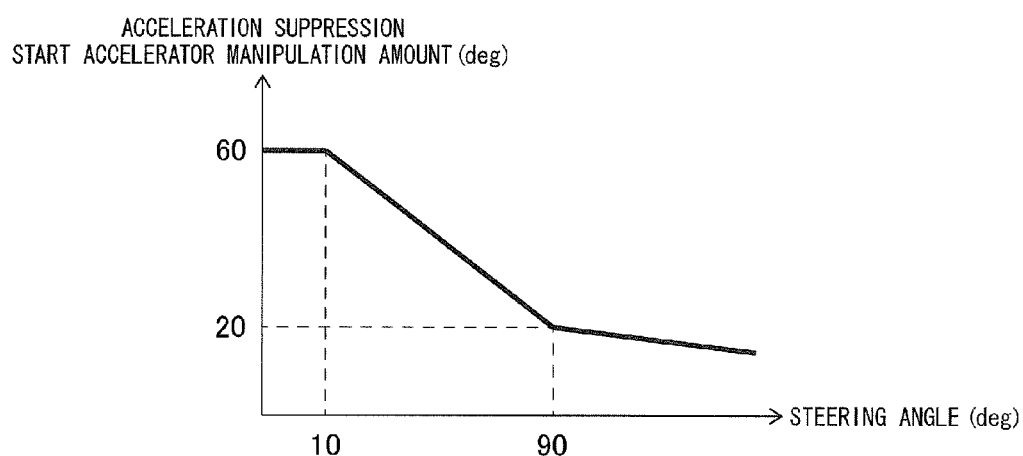
FIG. 4 is a view illustrative of a relationship between a steering manipulation amount detected by a steering manipulation amount detector and a drive force manipulation amount threshold.

(P1): As the steering manipulation amount detected by the steering manipulation amount detector 36 is larger, as illustrated in FIG. 4, the drive force manipulation amount threshold is set to a smaller value. It is to be noted that FIG. 4 is a view illustrative of a relationship between the steering manipulation amount detected by the steering manipulation amount detector 36 and a drive force manipulation amount threshold. In addition, in FIG. 4, the steering manipulation amount detected by the steering manipulation amount detector 36 is indicated by "steering angle (deg)", whereas the drive force manipulation amount threshold is indicated by "acceleration suppression start accelerator manipulation amount (deg)".

In other words, in the process of (P1), as the steering manipulation amount detected by the steering manipulation amount detector 36 is larger, the drive force manipulation amount threshold is set to a smaller value, so as to carry out the process of limiting the drive force of the vehicle to the drive force limit value promptly.

Figure 5:
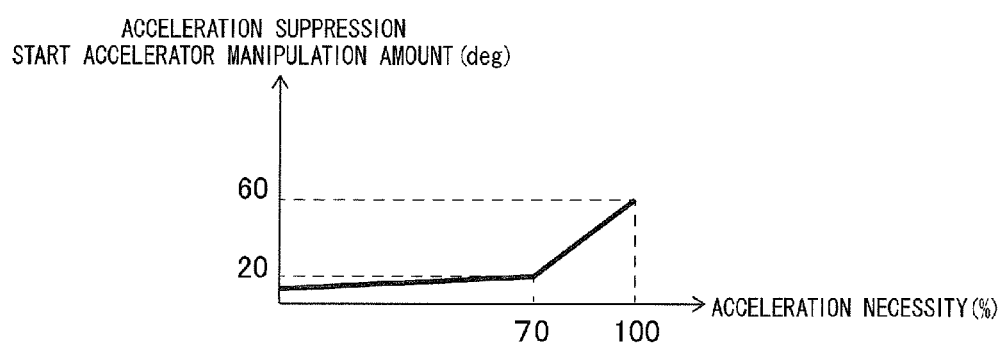
FIG. 5 is a view illustrative of a relationship between the drive force increase necessity calculated by a drive force increase necessity calculator and a drive force manipulation amount threshold.

(P2): As the drive force increase necessity calculated by the drive force increase necessity calculator 38 is lower, as illustrated in FIG. 5, the drive force manipulation amount threshold is set to a smaller value. It is to be noted that FIG. 5 is a view illustrative of a relationship between the drive force increase necessity calculated by the drive force increase necessity calculator 38 and a drive force manipulation amount threshold. In addition, in FIG. 5, the drive force manipulation amount threshold is indicated by "acceleration suppression start accelerator manipulation amount (deg)".

In other words, in the process of (P2), as the drive force increase necessity calculated by the drive force increase necessity calculator 38 is lower, the drive force manipulation amount threshold is set to a smaller value, so as to carry out the process of limiting the drive force of the vehicle to the drive force limit value promptly.

Figure 6:
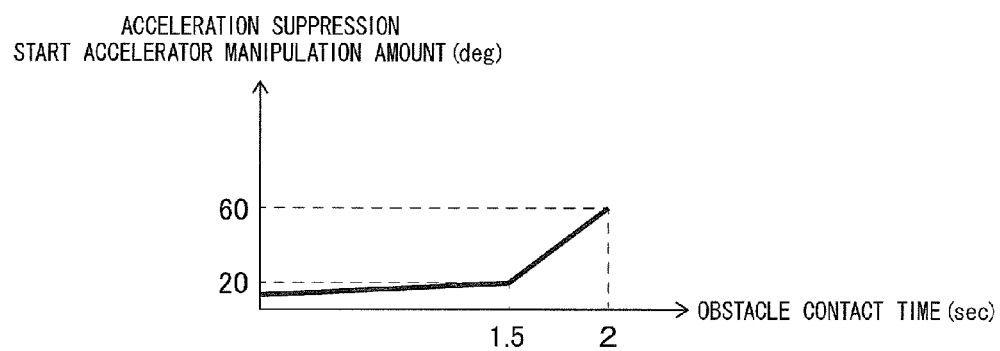
FIG. 6 is a view illustrative of a relationship between the obstacle contact time calculated by a contact time calculator and the drive force manipulation amount threshold.

(P3): As the obstacle contact time calculated by the contact time calculator 42 is shorter, as illustrated in FIG. 6, the drive force manipulation amount threshold is set to a smaller value. It is to be noted that FIG. 6 is a view illustrative of a relationship between the obstacle contact time calculated by the contact time calculator 42 and the drive force manipulation amount threshold. In addition, in FIG. 6, the drive force manipulation amount threshold is indicated by "acceleration suppression start accelerator manipulation amount (deg)".

In other words, in the process of (P3), as the obstacle contact time calculated by the contact time calculator 42 is shorter, the drive force manipulation amount threshold is set to a smaller value, so as to carry out the process of limiting the drive force of the vehicle to the drive force limit value promptly.

Figure 7:
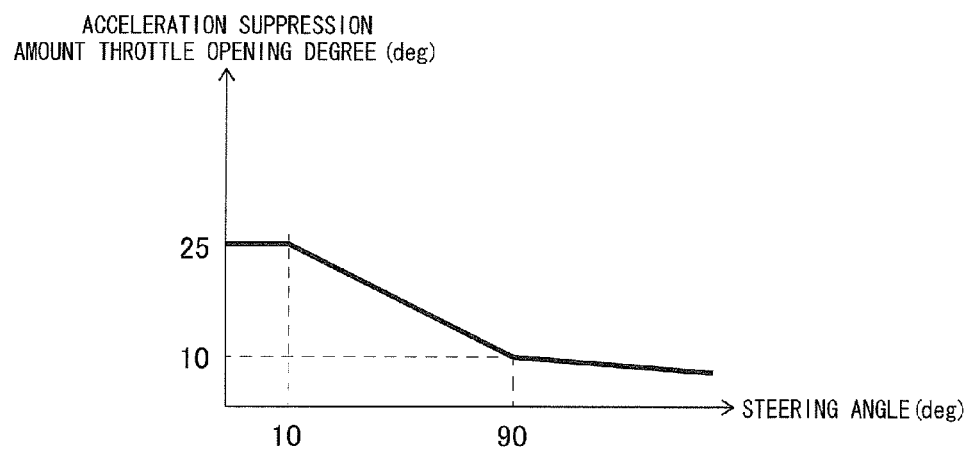
FIG. 7 is a view illustrative of a relationship between a steering manipulation amount detected by the steering manipulation amount detector and a drive force limit value.

(P4): As the steering manipulation amount detected by the steering manipulation amount detector 36 is larger, as illustrated in FIG. 7, the drive force limit value is set to a smaller value. It is to be noted that FIG. 7 is a view illustrative of a relationship between the steering manipulation amount detected by the steering manipulation amount detector 36 and the drive force limit value. In addition, in FIG. 7, the steering manipulation amount detected by the steering manipulation amount detector 36 is indicated by "steering angle (deg)", whereas the drive force limit value is indicated by "acceleration suppression amount throttle opening degree (deg)".

In other words, in the process of (P4), as the steering manipulation amount detected by the steering manipulation amount detector 36 is larger, the drive force limit value is set to a larger value and the suppression amount with respect to the drive force of the vehicle is increased, so as to carry out the process of limiting the drive force to the drive force limit value promptly.

Figure 8:
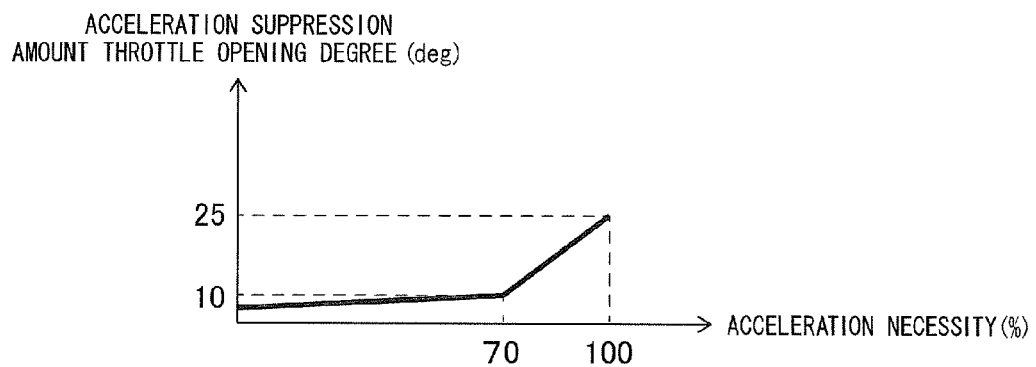
FIG. 8 is a view illustrative of a relationship between the drive force increase necessity calculated by the drive force increase necessity calculator and the drive force limit value.

(P5): As the drive force increase necessity calculated by the drive force increase necessity calculator 38 is lower, as illustrated in FIG. 8, the drive force limit value is set to a smaller value. It is to be noted that FIG. 8 is a view illustrative of a relationship between the drive force increase necessity calculated by the drive force increase necessity calculator 38 and the drive force limit value. In addition, in FIG. 8, the drive force limit value is indicated by "acceleration suppression amount throttle opening degree (deg)".

In other words, in the process of (P5), as the drive force increase necessity calculated by the drive force increase necessity calculator 38 is lower, the drive force limit value is set to a smaller value and the suppression amount with respect to the drive force of the vehicle is increased, so as to carry out the process of limiting the drive force to the drive force limit value promptly.

Figure 9:
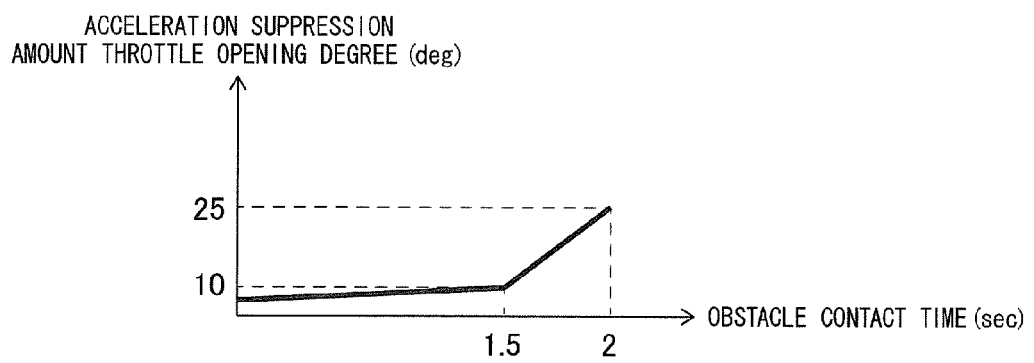
FIG. 9 is a view illustrative of a relationship between the obstacle contact time calculated by the contact time calculator and the drive force limit value.

(P6): As the obstacle contact time calculated by the contact time calculator 42 is shorter, as illustrated in FIG. 9, the drive force limit value is set to a smaller value. It is to be noted that FIG. 9 is a view illustrative of a relationship between the obstacle contact time calculated by the contact time calculator 42 and the drive force limit value. In addition, in FIG. 9, the drive force limit value is indicated by "acceleration suppression start accelerator manipulation amount (deg)".

In other words, in the process of (P6), as the obstacle contact time calculated by the contact time calculator 42 is shorter, the drive force limit value is set to a smaller value and the suppression amount with respect to the drive force of the vehicle is increased, so as to carry out the process of limiting the drive force to the drive force limit value promptly.

As described above, the drive force limit unit 44 is configured to change the setting of the drive force manipulation amount threshold depending on the steering manipulation amount detected by the steering manipulation amount detector 36. In addition, the drive force limit unit 44 is configured to change the setting of the drive force limit value depending on the steering manipulation amount detected by the steering manipulation amount detector 36.

In addition, as described above, the drive force limit unit 44 is configured to limit the drive force of the vehicle to the drive force limit value depending on the steering manipulation amount detected by the steering manipulation amount detector 36, when at least the condition (A) and the condition (B) are satisfied from the conditions (A) to (C).

(Operation)

Next, referring to FIG. 1 to FIG. 9, by using FIG. 10 to FIG. 13, an example of the operation to be performed by using the vehicle acceleration suppression device 1 in the present embodiment will be described.

Figure 10:
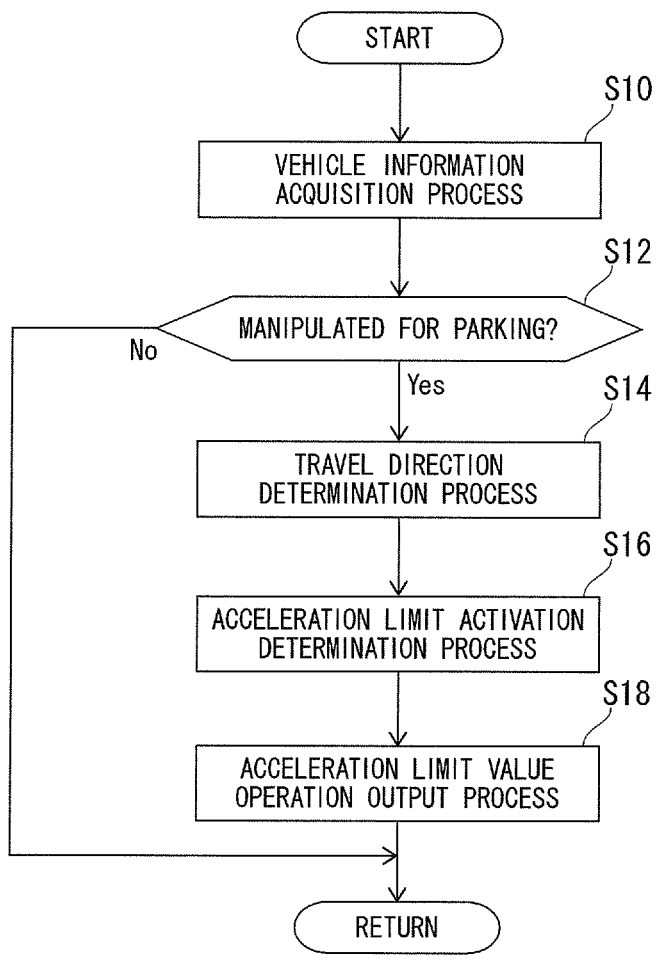
FIG. 10 is a flow chart of an operation to be performed by using a vehicle acceleration suppression device.

FIG. 10 is a flow chart of the operation to be performed by using the vehicle acceleration suppression device 1. It is to be noted that the vehicle acceleration suppression device 1 is configured to carry out the processing to be described below at every predefined sampling time (for example, 50 msec).

As illustrated in FIG. 10, when the vehicle acceleration suppression device 1 starts processing (START), firstly, in step S10, a process ("vehicle information acquisition process" illustrated in the drawing) of acquiring various pieces of vehicle information is carried out. When the processing of acquiring various pieces of vehicle information is carried out in step S10, the processing to be carried out by the vehicle acceleration suppression device 1 goes to step S12.

Herein, the various pieces of vehicle information includes information about the relative distance detected by the obstacle relative distance detector 32, information about the drive force manipulation amount detected by the drive force manipulation amount detector 34, and information about the steering manipulation amount detected by the steering manipulation amount detector 36. In addition to this, the various pieces of vehicle information include information about the speed detected by the vehicle speed detector 40, information about the shift position operated by the shift position operation unit 14, and information about the pressed amount of the brake pedal 28 operated by the brake pedal manipulation information operation unit 20.

In step S12, whether or not the vehicle is being manipulated for parking ("manipulated for parking?" illustrated in the drawing) is determined based on information about the speed and the information about the shift position, from the various pieces of vehicle information acquired in step S10.

In step S12, when it is determined that the vehicle is being manipulated for parking ("Yes" illustrated in the drawing), the processing to be carried out by the vehicle acceleration suppression device 1 goes to step S14.

Conversely, in step S12, when it is determined that the vehicle is not being manipulated for parking ("No" illustrated in the drawing), the processing to be carried out by the vehicle acceleration suppression device 1 returns (RETURN) to the process in step S10.

In step S14, a process ("travel direction determination process" illustrated in the drawing) of determining a travel direction of the vehicle is carried out based on the information about the speed and the information about the shift position, from the various pieces of vehicle information acquired in step S10. In step S14, when the process of determining the travel direction of the vehicle is carried out, the process to be carried out by the vehicle acceleration suppression device 1 goes to step S16.

In step S16, the information about the relative distance, the information about the drive force manipulation amount, the information about the steering manipulation amount, the information about the pressed amount of the brake pedal 28, and the travel direction of the vehicle determined in step S14 are referred to from the various pieces of vehicle information acquired in step S10. Then, a process of setting the drive force manipulation amount threshold and a process of ("acceleration limit activation determination process" illustrated in the drawing) determining whether or not the drive force of the vehicle is limited to the drive force limit value are carried out based on the various pieces of vehicle information that have been referred to and a determination result.

In step S16, when the process of setting the drive force manipulation amount threshold and the process of determining whether or not the drive force of the vehicle is limited to the drive force limit value are carried out, the processing to be carried out by the vehicle acceleration suppression device 1 goes to step S18. It is to be noted that a specific example of the process in step S16 will be described later.

In step S18, a process ("acceleration limit value operation output process" illustrated in the drawing) of setting the drive force limit value is carried out based on the information about the relative distance, the information about the drive force manipulation amount, and the information about the steering manipulation amount, from the various pieces of vehicle information acquired in step S10. In addition to this, when it is determined in step S16 that the drive force of the vehicle is limited to the drive force limit value, the drive force limit value that has been set is operated as the drive force limit demand value, so as to carry out the process of outputting a drive force limit demand value signal to the acceleration suppression controller 26.

In step S18, when at least the process of setting the drive force limit value is carried out, the processing to be carried out by the vehicle acceleration suppression device 1 returns to the process of step S10 (RETURN). It is to be noted that a specific example of the process to be carried out in step S18 will be described later.

Hereinafter, as to the processes to be carried out in step S16 and step S18, three specific examples (specific examples 1 to 3) will be described by using time charts.
Specific Example 1

Firstly, in three specific examples, an example (hereinafter, also referred to as "specific example 1") of setting the drive force manipulation amount threshold and the drive force limit value based on the size of the steering manipulation amount that has been detected by the steering manipulation amount detector 36 will be described.

Figure 11:
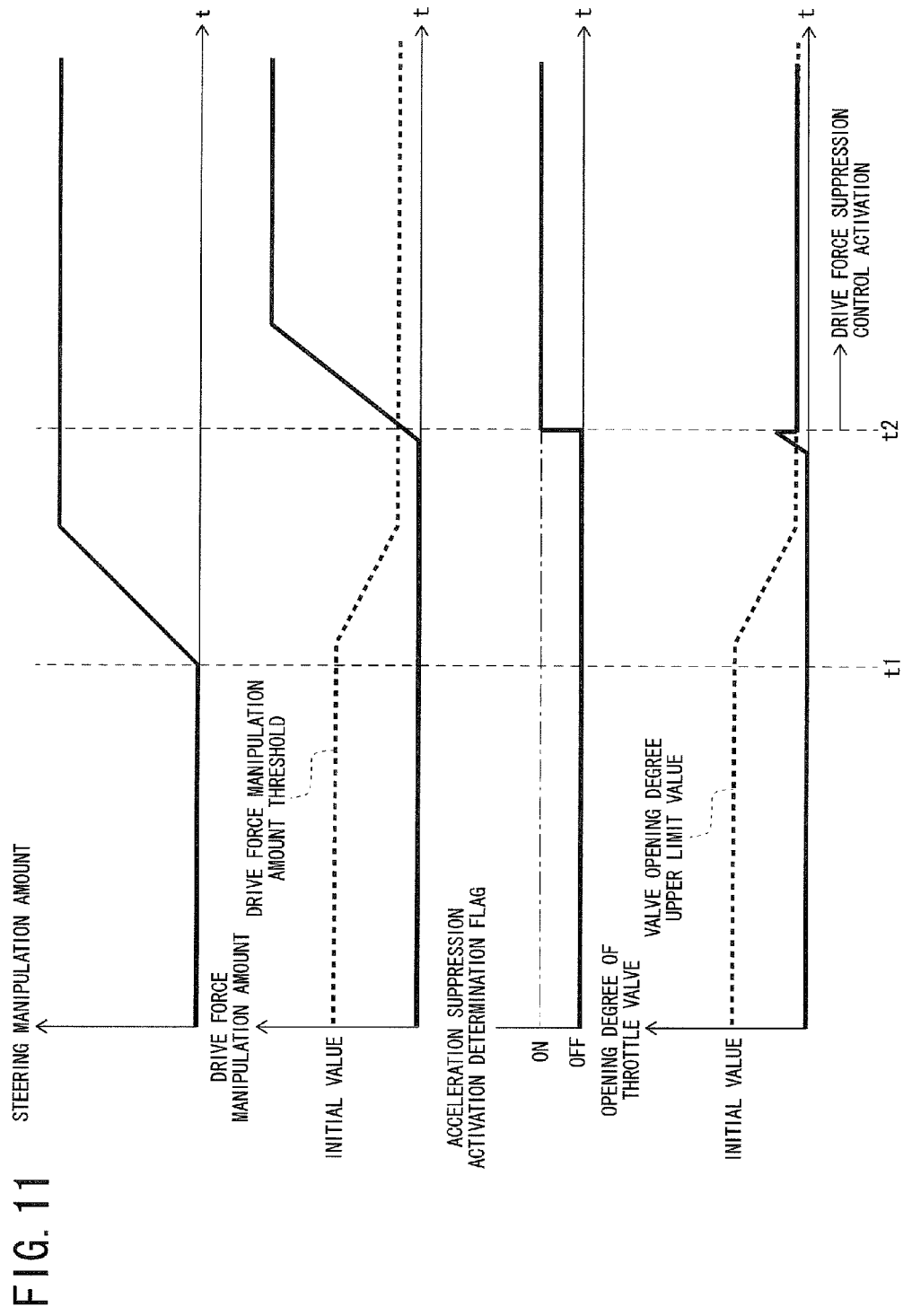
FIG. 11 is a view illustrative of a time chart when the drive force manipulation amount threshold and the drive force limit value are set based on the size of the steering manipulation amount detected by the steering manipulation amount detector.

In the specific example 1, as illustrated in FIG. 11, in a state where the steering manipulation amount detected by the steering manipulation amount detector 36 is "0", namely the steering manipulation element is not manipulated, the drive force manipulation amount threshold is set to a predefined initial value ("initial value" illustrated in the drawing). In addition to this, the drive force limit value is set to a predefined initial value, and an upper limit value of the opening degree of the throttle valve 46 ("valve opening degree upper limit value" illustrated in the drawing) is set to a predefined initial value ("initial value" illustrated in the drawing). It is to be noted that FIG. 11 is a view illustrative of a time chart when the drive force manipulation amount threshold and the drive force limit value are set based on the size of the steering manipulation amount that has been detected by the steering manipulation amount detector 36.

Also, in FIG. 11, dotted lines indicate the drive force manipulation amount threshold and the valve opening degree upper limit value.

In addition to this, in a state where the drive force manipulation amount that has been detected by the drive force manipulation amount detector 34 does not exceed the drive force manipulation amount threshold, the above condition (A) is not satisfied. Hence, a state ("OFF" illustrated in the drawing) of not satisfying a drive force suppression activation determination flag is set. Accordingly, the drive force limit demand value signal is not output to the acceleration suppression controller 26.

Then, at the time point when the steering manipulation element is manipulated, that is at the time point t1 when the steering manipulation amount detected by the steering manipulation amount detector 36 exceeds "0", the above processes of (P1) and (P4) are carried out.

By carrying out the process of (P1), as the steering manipulation amount detected by the steering manipulation amount detector 36 is larger, the drive force manipulation amount threshold is set to a smaller value (see FIG. 4). In addition to this, by carrying out the process of (P4), as the steering manipulation amount detected by the steering manipulation amount detector 36 is larger, the drive force limit value is set to a smaller value (see FIG. 7), so as to decrease the valve opening degree upper limit value and increase a suppression amount with respect to the drive force of the vehicle.

After the time point t1, when the driver presses the accelerator pedal 30 and the drive force manipulation amount detected by the drive force manipulation amount detector 34 is increased, the condition (A) is satisfied at the time point T2 when the detected drive force manipulation amount exceeds the drive force manipulation amount threshold. Thus, as a state where the drive force suppression activation determination flag is satisfied ("ON" illustrated in the drawing), the drive force limit demand value signal is output to the acceleration suppression controller 26.

When the drive force limit demand value signal is output to the acceleration suppression controller 26, the opening degree of the throttle valve 46 is changed to make the opening degree of the throttle valve 46 conform with the opening degree depending on the valve opening degree upper limit value, so that the drive force of the vehicle becomes the drive force limit value. Accordingly, after the time point t2, control of suppressing the drive force of the vehicle ("drive force suppression control activation" illustrated in the drawing) is performed.

As discussed above, by carrying out the processes in step S16 and step S18 in the specific example 1, when there is an obstacle near the vehicle while the driver is parking the vehicle, as the steering manipulation amount is larger, the drive force manipulation amount threshold is set to a smaller value. Accordingly, when the vehicle comes into contact with an obstacle at a high possibility and there is not an enough time to the contact (there is a short distance between the vehicle and the obstacle), it is possible to limit the drive force of the vehicle to a drive force limit value promptly.

In addition, when there is an obstacle near the vehicle while the driver is parking the vehicle, as the steering manipulation amount is larger, in other words, as there is a higher possibility that the vehicle comes into contact with the obstacle existing near the vehicle such as another vehicle or the like, the drive force manipulation amount threshold is set to a smaller value. When there is a high possibility that the vehicle comes into contact with the obstacle existing near the vehicle such as another vehicle or the like, the drive force manipulation amount threshold is set to a smaller value, as the steering manipulation amount is larger, so that the drive force of the vehicle can be limited.

Accordingly, even if a driver makes an inappropriate driving manipulation, such as a driver's misunderstanding, an incorrect manipulation, or the like at the time of driving the vehicle, the drive force of the vehicle is limited more, as the steering manipulation amount is larger, so that an approach of the vehicle to an obstacle can be suppressed and a contact between the vehicle and the obstacle can be suppressed.

Specific Example 2

Next, in the three specific examples, an example (hereinafter, also referred to as "specific example 2") of setting the drive force manipulation amount threshold and the drive force limit value based on the necessity level of the drive force increase necessity that has been calculated by the drive force increase necessity calculator 38 will be described.

In the specific example 2, as illustrated in FIG. 12, in a state where the drive force increase necessity calculated by the drive force increase necessity calculator 38 has a high necessity level, the drive force manipulation amount threshold is set to a predefined initial value ("initial value" illustrated in the drawing). In addition to this, the drive force limit value is set to a predefined initial value, and an upper limit value ("valve opening degree upper limit value" illustrated in the drawing) of the opening degree of the throttle valve 46 is set to the predefined initial value ("initial value" illustrated in the drawing). It is to be noted that FIG. 12 is a view illustrative of a time chart when the drive force manipulation amount threshold and the drive force limit value are set based on the height level of the drive force increase necessity calculated by the drive force increase necessity calculator 38. Also, in FIG. 12, dotted lines indicate the drive force manipulation amount threshold and the valve opening degree upper limit value.

In addition to this, in a state where the drive force manipulation amount detected by the drive force manipulation amount detector 34 does not exceed the drive force manipulation amount threshold, the above condition (A) is not satisfied. Hence, a state ("OFF" illustrated in the drawing) of not satisfying the drive force suppression activation determination flag is set. Accordingly, the drive force limit demand value signal is not output to the acceleration suppression controller 26.

Then, at the time point t3 when the drive force increase necessity calculated by the drive force increase necessity calculator 38 drops, the above processes of (P2) and (P5) are carried out.

By carrying out the process of (P2), as the drive force increase necessity calculated by the drive force increase necessity calculator 38 is lower, the drive force manipulation amount threshold is set to a smaller value (see FIG. 5 or the like). In addition to this, by carrying out the process of (P5), as the drive force increase necessity calculated by the drive force increase necessity calculator 38 is lower, the drive force limit value is set to a smaller value (see FIG. 8 or the like), so that the valve opening degree upper limit value is decreased and an suppression amount with respect to the drive force of the vehicle is increased.

After the time point t3, when the driver presses the accelerator pedal 30 and the drive force manipulation amount detected by the drive force manipulation amount detector 34 is increased, the above condition (A) is satisfied at the time point t4 when the detected drive force manipulation amount exceeds the drive force manipulation amount threshold. Accordingly, as a state of satisfying the drive force suppression activation determination flag ("ON" illustrated in the drawing), the drive force limit demand value signal is output to the acceleration suppression controller 26.

When the drive force limit demand value signal is output to the acceleration suppression controller 26, the opening degree of the throttle valve 46 is changed to make the opening degree of the throttle valve 46 conform with the opening degree depending on the valve opening degree upper limit value, so that the drive force of the vehicle becomes the drive force limit value. Accordingly, after the time point t4, control of suppressing the drive force of the vehicle ("drive force suppression control activation" illustrated in the drawing) is performed.

As described above, by carrying out the processes of step S16 and step S18 in the specific example 2, while the driver is parking the vehicle, as the drive force increase necessity is lower and the necessity to accelerate the vehicle is lower, the drive force manipulation amount threshold is set to a smaller value. Accordingly, when there is an obstacle existing near the vehicle and the vehicle comes into contact with the obstacle at a high possibility and there is not an enough time (there is a short distance between the vehicle and the obstacle), it is possible to carry out the process of limiting the drive force of the vehicle to the drive force limit value promptly.

In addition, as the necessity to accelerate the vehicle is lower, the drive force manipulation amount threshold is set to a smaller value. Hence, by suppressing the drive force of the vehicle, it is possible to suppress a driver's feel of uneasy caused by a gap between the manipulation state of the accelerator pedal 30 and the acceleration state of the vehicle.

Specific Example 3

Next, in the three specific examples, an example (hereinafter, also referred to as "specific example 3") of setting the drive force manipulation amount threshold and the drive force limit value based on a time length of the obstacle contact time calculated by the contact time calculator 42 will be described.

In the specific example 3, as illustrated in FIG. 13, in a state where the obstacle contact time calculated by the contact time calculator 42 is long, the drive force manipulation amount threshold is set to a predefined initial value ("initial value" illustrated in the drawing). In addition to this, the drive force limit value is set to the predefined initial value, and the upper limit value ("valve opening degree upper limit value" illustrated in the drawing) of the opening degree of the throttle valve 46 is set to the predefined initial value ("initial value" illustrated in the drawing). It is to be noted that FIG. 13 is a view illustrative of a time chart when the drive force manipulation amount threshold and the drive force limit value are set based on the time length of the obstacle contact time calculated by the contact time calculator 42. Also, in FIG. 13, dotted lines indicate the drive force manipulation amount threshold and the valve opening degree upper limit value.

In addition to this, in a state where the drive force manipulation amount detected by the drive force manipulation amount detector 34 does not exceed the drive force manipulation amount threshold, the condition (A) is not satisfied. Hence, a state ("OFF" illustrated in the drawing) that does not satisfy the drive force suppression activation determination flag is set. Accordingly, the drive force limit demand value signal is not output to the acceleration suppression controller 26.

Then, at the time point t5 when the obstacle contact time calculated by the contact time calculator 42 becomes shorter, processes of the above (P3) and (P6) are carried out.

By carrying out the process of (P3), as the obstacle contact time calculated by the contact time calculator 42 is shorter, the drive force manipulation amount threshold is set to a smaller value (see FIG. 6 or the like). In addition to this, by carrying out the process of (P6), as the obstacle contact time calculated by the contact time calculator 42 is shorter, the drive force limit value is set to a smaller value (see FIG. 9 or the like), so that the valve opening degree upper limit value is decreased and the suppression amount with respect to the drive force of the vehicle is increased.

After the time point t5, when the driver presses the accelerator pedal 30 and the drive force manipulation amount detected by the drive force manipulation amount detector 34 is increased, the condition (A) is satisfied at the time point t6 when the detected drive force manipulation amount exceeds the drive force manipulation amount threshold. Accordingly, as a state of satisfying the drive force suppression activation determination flag ("ON" illustrated in the drawing), the drive force limit demand value signal is output to the acceleration suppression controller 26.

When the drive force limit demand value signal is output to the acceleration suppression controller 26, the opening degree of the throttle valve 46 is changed to conform the opening degree of the throttle valve 46 with the opening degree depending on the valve opening degree upper limit value, so that the drive force of the vehicle becomes the drive force limit value. Therefore, after the time point t6, control of suppressing the drive force of the vehicle ("drive force suppression control activation" illustrated in the drawing) is performed.

As described above, by carrying out the processes in step S16 and step S18 in the specific example 3, when there is an obstacle existing near the vehicle while the driver is parking the vehicle, as the obstacle contact time is shorter, the drive force manipulation amount threshold is set to a smaller value. Accordingly, when the vehicle comes into contact with an obstacle at a high possibility and there is not an enough time to the contact (there is a short distance between the vehicle and the obstacle), it is possible to carry out processing of limiting the drive force of the vehicle to the drive force limit value promptly.

It is to be noted that as described above, the acceleration suppression method to be performed in the operation of the vehicle acceleration suppression device 1 in the present embodiment is a method of limiting the drive force of the vehicle to the predefined drive force limit value depending on the manipulation amount of the steering manipulation element that is a manipulation amount of the steering manipulation element that can be manipulated by a driver of the vehicle. Herein, the drive force is limited, when the relative distance between the vehicle and the obstacle is equal to or shorter than a predefined limiting relative distance, the driver of the vehicle is able to manipulate, and the manipulation amount of the drive force instruction manipulation element for instructing the drive force of the vehicle exceeds the predefined drive force manipulation amount threshold.

(Effects of First Embodiment)

According to the vehicle acceleration suppression device 1 in the present embodiment, effects to be described below can be brought out.

(1) The drive force limit unit 44 is configured to carry out the process of limiting the drive force of the vehicle MC to a drive force limit value depending on the steering manipulation amount detected by the steering manipulation amount detector 36. The process of limiting the drive force of the vehicle MC to the drive force limit value is carried out, when the relative distance detected by the obstacle relative distance detector 32 is equal to or shorter than the limiting relative distance and the drive force manipulation amount detected by the drive force manipulation amount detector 34 exceeds the drive force manipulation amount threshold.

Accordingly, even if a driver makes an inappropriate driving manipulation, such as a driver's misunderstanding, an incorrect manipulation, or the like at the time of driving the vehicle, as the obstacle and the vehicle MC come into contact at a higher possibility, an increase in acceleration of the vehicle MC can be suppressed depending on the driver's manipulation amount of the steering manipulation element.

As a result, even if a driver makes an inappropriate driving manipulation, it is possible to suppress a contact between the vehicle MC and the obstacle depending on the possibility that the vehicle MC comes into contact with the obstacle based on the driver's manipulation amount of the steering manipulation element.

Also, while the driver is parking the vehicle, as the vehicle MC comes into contact with the obstacle such as another vehicle existing near the vehicle MC at a higher possibility, the drive force manipulation amount threshold is set to a smaller value. Accordingly, when the vehicle MC comes into contact with the obstacle such as another vehicle existing near the vehicle MC at a high possibility, the drive force manipulation amount threshold is set to a smaller value, as the steering manipulation amount is larger, so that the drive force of the vehicle MC can be limited.

Hence, even if a driver makes an inappropriate driving manipulation, the drive force of the vehicle MC is limited, as the steering manipulation amount is larger, so that approach of the vehicle MC to the obstacle can be suppressed and the contact between the vehicle MC and the obstacle can be suppressed.

(2) The drive force limit unit 44 is configured to change the setting of the drive force manipulation amount threshold depending on the steering manipulation amount detected by the steering manipulation amount detector 36.

Accordingly, it is possible to change the time to start carrying out of the process of limiting the drive force of the vehicle MC to a drive force limit value depending on the steering manipulation amount detected by the steering manipulation amount detector 36.

As a result, even if a driver makes an inappropriate driving manipulation, it is possible to change the time to start the suppression of an increase in acceleration of the vehicle MC based on the driver's manipulation amount of the steering manipulation element.

(3) The drive force limit unit 44 is configured to set the drive force manipulation amount threshold to a smaller value, as the steering manipulation amount detected by the steering manipulation amount detector 36 is larger.

Accordingly, as the steering manipulation amount detected by the steering manipulation amount detector 36 is larger and the vehicle MC comes into contact with an obstacle at a higher possibility, it is possible to accelerate the time to start carrying out of the process of limiting the drive force of the vehicle MC to a drive force limit value.

As a result, even if a driver makes an inappropriate driving manipulation, as the vehicle MC comes into contact with an obstacle at a higher possibility, it is possible to suppress an increase in acceleration of the vehicle MC promptly based on the driver's manipulation amount of the steering manipulation element.

(4) The drive force increase necessity calculator 38 is configured to calculate the drive force increase necessity based on the relative distance detected by the obstacle relative distance detector 32 and the steering manipulation amount detected by the steering manipulation amount detector 36. In addition to this, the drive force limit unit 44 is configured to set the drive force manipulation amount threshold to a smaller value, as the drive force increase necessity is lower.

Accordingly, as the drive force increase necessity calculated by the drive force increase necessity calculator 38 is lower and the vehicle MC comes into contact with an obstacle at a higher possibility, it is possible to accelerate the time to start carrying out of the process of limiting the drive force of the vehicle MC to a drive force limit value.

As a result, even if a driver makes an inappropriate driving manipulation, as the vehicle MC comes into contact with an obstacle at a higher possibility, it is possible to suppress an increase in acceleration of the vehicle MC promptly based on the drive force increase necessity calculated by the drive force increase necessity calculator 38.

(5) The contact time calculator 42 is configured to calculate the obstacle contact time that is a period of time that elapses until the vehicle MC comes into contact with an obstacle. In addition to this, the drive force limit unit 44 is configured to set the drive force manipulation amount threshold to a smaller value, as the obstacle contact time calculated by the contact time calculator 42 is shorter.

Accordingly, as the obstacle contact time calculated by the contact time calculator 42 is shorter and the vehicle MC comes into contact with an obstacle at a higher possibility, it is possible to accelerate the time to start carrying out of the process of limiting the drive force of the vehicle MC to a drive force limit value.

As a result, even if a driver makes an inappropriate driving manipulation, as the vehicle MC comes into contact with an obstacle at a higher possibility, it is possible to suppress an increase in acceleration of the vehicle MC promptly based on the obstacle contact time calculated by the contact time calculator 42.

(6) The drive force limit unit 44 is configured to change the setting of the drive force limit value depending on the steering manipulation amount detected by the steering manipulation amount detector 36.

Accordingly, it is possible to change the drive force limit value for limiting the drive force of the vehicle MC depending on the steering manipulation amount detected by the steering manipulation amount detector 36.

As a result, even if a driver makes an inappropriate driving manipulation, it is possible to change the suppression degree of an increase in acceleration of the vehicle MC based on the driver's manipulation amount of the steering manipulation element.

(7) The drive force limit unit 44 is configured to set the drive force limit value to a smaller value, as the steering manipulation amount detected by the steering manipulation amount detector 36 is larger.

Accordingly, as the steering manipulation amount detected by the steering manipulation amount detector 36 is larger and the vehicle MC comes into contact with an obstacle at a higher possibility, the drive force limit value for limiting the drive force of the vehicle MC is decreased, so that a suppression amount of the vehicle with respect to the drive force can be increased.

As a result, even if a driver makes an inappropriate driving manipulation, as the vehicle MC comes into contact with an obstacle at a higher possibility, it is possible to suppress an increase in acceleration of the vehicle MC promptly based on the driver's manipulation amount of the steering manipulation element. Accordingly, as the vehicle MC comes into contact with an obstacle at a higher possibility, it is possible to suppress an increase in acceleration of the vehicle MC promptly.

(8) The drive force increase necessity calculator 38 is configured to calculate the drive force increase necessity based on the relative distance detected by the obstacle relative distance detector 32 and the steering manipulation amount detected by the steering manipulation amount detector 36. In addition to this, the drive force limit unit 44 is configured to set the drive force limit value to a smaller value, as the drive force increase necessity is lower.

Accordingly, when the drive force increase necessity calculated by the drive force increase necessity calculator 38 is lower and the vehicle MC comes into contact with an obstacle at a higher possibility, a drive force limit value for limiting the drive force of the vehicle MC is increased, so that a suppression amount of the vehicle with respect to the drive force can be decreased.

As a result, even if a driver makes an inappropriate driving manipulation, as the vehicle MC comes into contact with an obstacle at a higher possibility, the suppression degree of an increase in acceleration of the vehicle MC can be increased based on the drive force increase necessity calculated by the drive force increase necessity calculator 38. Accordingly, as the vehicle MC comes into contact with an obstacle at a higher possibility, it is possible to suppress an increase in acceleration of the vehicle MC promptly.

(9) The contact time calculator 42 is configured to calculate the obstacle contact time that is a period of time that elapses until the vehicle MC comes into contact with an obstacle. In addition to this, the drive force limit unit 44 is configured to set the drive force limit value to a smaller value, as the obstacle contact time calculated by the contact time calculator 42 is shorter.

Accordingly, as the obstacle contact time calculated by the contact time calculator 42 is shorter and the vehicle MC comes into contact with an obstacle at a higher possibility, the drive force limit value for limiting the drive force of the vehicle MC is increased, so that a suppression amount of the vehicle with respect to the drive force can be decreased.

As a result, even if a driver makes an inappropriate driving manipulation, as the vehicle MC comes into contact with an obstacle at a higher possibility, it is possible to increase a suppression degree of an increase in acceleration of the vehicle MC based on the obstacle contact time calculated by the contact time calculator 42. Accordingly, as the vehicle MC comes into contact with an obstacle at a higher possibility, it is possible to suppress an increase in acceleration of the vehicle MC promptly.

(10) The imaging unit 2 is configured to capture an image around the vehicle MC. In addition to this, the obstacle relative distance detector 32 is configured to detect the relative distance between the vehicle MC and the obstacle based on the image captured by the imaging unit 2.

As a result, as a configuration of acquiring information for detecting the relative distance, by using the imaging unit 2 (the front camera or the like), it is made possible to additionally include the configuration of acquiring the information for detecting the relative distance to a vehicle that does not originally include the imaging unit 2.

In addition, for example, in a case where the vehicle MC is a vehicle already including a device of processing the image captured by the imaging unit 2, such as a parking manipulation support device or the like, the imaging unit 2 can be used together with the processing to be carried out by the vehicle acceleration suppression device 1 in the present embodiment.

Also, for example, as a configuration of acquiring the information for detecting the relative distance, it is possible to acquire the information for detecting the relative distance from a wider range around the vehicle MC than a case where the distance is measured by using radio waves with a storing directivity such as a millimeter wave radar.

(11) According to the vehicle acceleration suppression method in the present embodiment, the drive force of the vehicle MC is limited to a predefined drive force limit value depending on the manipulation amount of the steering manipulation element. Herein, the drive force is limited when the relative distance between the vehicle MC and the obstacle is equal to or shorter than the predefined limiting relative distance and the manipulation amount of the opening degree of the drive force instruction manipulation element exceeds the predefined drive force manipulation amount threshold.

Accordingly, even if a driver makes an inappropriate driving manipulation, as the vehicle MC comes into contact with an obstacle at a higher possibility, it is possible to suppress an increase in acceleration of the vehicle MC depending on the driver's manipulation amount of the steering manipulation element.

As a result, even if a driver makes an inappropriate driving manipulation, it is possible to suppress a contact between the vehicle MC and the obstacle depending on the possibility that the vehicle MC comes into contact with the obstacle.

Also, while the driver is parking the vehicle, as the vehicle MC comes into contact with an obstacle such as another vehicle existing near the vehicle MC at a higher possibility, the drive force manipulation amount threshold is set to a smaller value. Accordingly, when the vehicle MC comes into contact with an obstacle such as another vehicle existing near the vehicle MC at a higher possibility, as the steering manipulation amount is larger, the drive force manipulation amount threshold is set to a smaller value, so that the drive force of the vehicle MC can be limited.

Accordingly, even if a driver makes an inappropriate driving manipulation, as the steering manipulation amount is larger, the drive force of the vehicle MC is limited and approach of the vehicle MC to an obstacle is suppressed, so that a contact of the vehicle MC with the obstacle can be suppressed.

(Modifications)

(1) In one embodiment, the obstacle relative distance detector 32 is configured to detect the relative distance based on the image captured by the imaging unit 2. The configuration of the obstacle relative distance detector 32, however, is not limited to this. In other words, the obstacle relative distance detector 32 may be configured to detect the relative distance based on, for example, the information acquired by using a configuration of transmitting and receiving radio waves of a millimeter wave radar or the like.

(2) In one embodiment, the acceleration suppression controller 26 is configured to change the opening degree of the throttle valve 46 based on the drive side pressed amount signal and the drive force limit demand value signal, so that the drive force of the vehicle MC becomes the drive force limit value. However, the present disclosure is not limited to this.

In other words, for example, the acceleration suppression controller 26 may be configured to change a brake fluid pressure based on the drive side pressed amount signal and the drive force limit demand value signal, so that the drive force of the vehicle MC becomes the drive force limit value.

In addition, for example, the acceleration suppression controller 26 may be configured to change at least one of the opening degree of the throttle valve and a brake fluid pressure based on the drive side pressed amount signal and the drive force limit demand value signal, so that the drive force of the vehicle MC becomes the drive force limit value.

Further, when the vehicle MC is an EV vehicle, for example, the acceleration suppression controller 26 may be configured to change values of current and voltage to be supplied to a motor so that the drive force of the vehicle MC becomes the drive force limit value. Herein, the EV vehicle (Electric Vehicle) means a vehicle including a motor as a drive source (electric automobile).

Furthermore, when the vehicle MC is an HEV vehicle, the acceleration suppression controller 26 may be configured to change at least one of the opening degree of the throttle valve 46 and values of current and voltage to be supplied to a motor so that the drive force of the vehicle MC becomes the drive force limit value. Herein, the HEV vehicle (Hybrid Electric Vehicle) means a vehicle including an engine and a motor as a drive source (hybrid car).

Herein, while a limited number of embodiments have been described with illustration, it should be apparent that the present disclosure is not limited to them and modifications and adaptations to each of the embodiments based on the above disclosure may occur to one skilled in the art.

The invention claimed is:

1. A vehicle acceleration suppression device comprising:
an obstacle relative distance detector configured to detect a relative distance between a vehicle and an obstacle;
a drive force manipulation amount detector configured to detect a drive force manipulation amount that is a manipulation amount of a drive force instruction manipulation element that can be manipulated by a driver of the vehicle and that instructs a drive force of the vehicle;
a steering manipulation amount detector configured to detect a steering manipulation amount that is the manipulation amount of a steering manipulation element that can be manipulated by the driver; and
a drive force limit unit configured to limit the drive force of the vehicle to a predefined drive force limit value, depending on the steering manipulation amount detected by the steering manipulation amount detector, when the relative distance detected by the obstacle relative distance detector is equal to or shorter than a predefined limiting relative distance and the drive force manipulation amount detected by the drive force manipulation amount detector exceeds a predefined drive force manipulation amount threshold,
wherein the drive force limit unit is configured to set the drive force manipulation amount threshold to decrease, as the steering manipulation amount detected by the steering manipulation amount detector increases.

2. The vehicle acceleration suppression device according to claim 1, further comprising a drive force increase necessity calculator configured to predict a course of the vehicle in a predefined range from a current location of the vehicle, and to calculate a ratio occupied by the obstacle in a range of a vehicle width of the vehicle on a predicted course of the vehicle as a drive force increase necessity that is a necessity for increasing the drive force of the vehicle based on the relative distance detected by the obstacle relative distance detector and the steering manipulation amount detected by the steering manipulation amount detector, wherein the drive force limit unit is configured to set the drive force manipulation amount threshold to decrease, as the drive force increase necessity calculated by the drive force increase necessity calculator decreases.

3. The vehicle acceleration suppression device according to claim 1, further comprising:
a vehicle speed detector configured to detect a speed of the vehicle; and
a contact time calculator configured to calculate an obstacle contact time that is a period of time that elapses until the vehicle comes into contact with the obstacle based on the relative distance detected by the obstacle relative distance detector, the steering manipulation amount detected by the steering manipulation amount detector, and the speed detected by the vehicle speed detector,
wherein the drive force limit unit is configured to set the drive force manipulation amount threshold to decrease, as the obstacle contact time calculated by the contact time calculator decreases.

4. The vehicle acceleration suppression device according to claim 1, wherein the drive force limit unit is configured to change setting of the drive force limit value depending on the steering manipulation amount detected by the steering manipulation amount detector.

5. A vehicle acceleration suppression device, comprising:
an obstacle relative distance detector configured to detect a relative distance between a vehicle and an obstacle;
a drive force manipulation amount detector configured to detect a drive force manipulation amount that is a manipulation amount of a drive force instruction manipulation element that can be manipulated by a driver of the vehicle and that instructs a drive force of the vehicle;
a steering manipulation amount detector configured to detect a steering manipulation amount that is the manipulation amount of a steering manipulation element that can be manipulated by the driver; and
a drive force limit unit configured to limit the drive force of the vehicle to a predefined drive force limit value, depending on the steering manipulation amount detected by the steering manipulation amount detector, when the relative distance detected by the obstacle relative distance detector is equal to or shorter than a predefined limiting relative distance and the drive force manipulation amount detected by the drive force manipulation amount detector exceeds a predefined drive force manipulation amount threshold,
wherein the drive force limit unit is configured to set the drive force limit value to decrease, as the steering manipulation amount detected by the steering manipulation amount detector increases.

6. The vehicle acceleration suppression device according to claim 5, further comprising a drive force increase necessity calculator configured to predict a course of the vehicle in a predefined range from a current location of the vehicle, and to calculate a ratio occupied by the obstacle in a range of a vehicle width of the vehicle on a predicted course of the vehicle as a drive force increase necessity that is a necessity for increasing the drive force of the vehicle based on the relative distance detected by the obstacle relative distance detector and the steering manipulation amount detected by the steering manipulation amount detector,
wherein the drive force limit unit is configured to set the drive force limit value to decrease, as the drive force increase necessity calculated by the drive force increase necessity calculator decreases.

7. The vehicle acceleration suppression device according to claim 5, further comprising:
a vehicle speed detector configured to detect a speed of the vehicle; and
a contact time calculator configured to calculate an obstacle contact time that is a period of time that elapses until the vehicle comes into contact with the obstacle based on the relative distance detected by the obstacle relative distance detector, the steering manipulation amount detected by the steering manipulation amount detector, and the speed detected by the vehicle speed detector,
wherein the drive force limit unit is configured to set the drive force limit value to decrease, as the obstacle contact time calculated by the contact time calculator decreases.

8. The vehicle acceleration suppression device according to claim 5, further comprising an imaging unit configured to capture an image of the surroundings of the vehicle,
wherein the obstacle relative distance detector is configured to detect the relative distance based on the image captured by the imaging unit.

9. A vehicle acceleration suppression method, comprising:
detecting a relative distance between a vehicle and an obstacle;
detecting a drive force manipulation amount that is a manipulation amount of a drive force instruction manipulation element that can be manipulated by a driver of the vehicle and that instructs a drive force of the vehicle;
detecting a steering manipulation amount that is the manipulation amount of a steering manipulation element that can be manipulated by the driver; and
limiting the drive force of the vehicle to a predefined drive force limit value, depending on the detected steering manipulation amount, when the detected relative distance is equal to or shorter than a limiting relative distance and the detected drive force manipulation exceeds a predefined manipulation amount threshold,
wherein in the limiting step, the drive force manipulation amount threshold is set to decrease as the detected steering manipulation amount increases.

10. A vehicle acceleration suppression method, comprising:
detecting a relative distance between a vehicle and an obstacle;
detecting a drive force manipulation amount that is a manipulation amount of a drive force instruction manipulation element that can be manipulated by a driver of the vehicle and that instructs a drive force of the vehicle;
detecting a steering manipulation amount that is the manipulation amount of a steering manipulation element that can be manipulated by the driver; and
limiting a drive force of a vehicle to a predefined drive force limit value, depending on the detected steering manipulation amount, when the detected relative distance is equal to or shorter than a limiting relative distance and the detected drive force manipulation amount exceeds a predefined manipulation amount threshold,
wherein in the limiting step, the drive force limit value is set to decrease, as the detected steering manipulation amount increases.

* * * * *